(12) United States Patent
Mizutani et al.

(10) Patent No.: US 10,892,500 B2
(45) Date of Patent: Jan. 12, 2021

(54) FUEL CELL SYSTEM

(71) Applicant: Toyota Jidosha Kabushiki Kaisha, Toyota (JP)

(72) Inventors: Chiaki Mizutani, Nisshin (JP); Yuji Ishikawa, Aichi-ken (JP); Shigeki Hasegawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 308 days.

(21) Appl. No.: 15/936,566

(22) Filed: Mar. 27, 2018

(65) Prior Publication Data

US 2018/0294494 A1 Oct. 11, 2018

(30) Foreign Application Priority Data

Apr. 10, 2017 (JP) ................................. 2017-77228

(51) Int. Cl.
*H01M 8/04492* (2016.01)
*H01M 8/04537* (2016.01)
*H01M 8/04992* (2016.01)
*H01M 8/1018* (2016.01)

(52) U.S. Cl.
CPC ... *H01M 8/04492* (2013.01); *H01M 8/04559* (2013.01); *H01M 8/04589* (2013.01); *H01M 8/04992* (2013.01); *H01M 2008/1095* (2013.01)

(58) Field of Classification Search
CPC .......................... H01M 8/04828–0485; H01M 8/04492–04529
See application file for complete search history.

(56) References Cited

U.S. PATENT DOCUMENTS

2014/0295302 A1  10/2014  Ishikawa et al.
2016/0356858 A1*  12/2016  Sakai ................... G01R 31/389

FOREIGN PATENT DOCUMENTS

JP   2014-203562 A    10/2014
JP   2014207049 A  *  10/2014

* cited by examiner

*Primary Examiner* — Robert S Carrico
(74) *Attorney, Agent, or Firm* — Dinsmore & Shohl LLP

(57) ABSTRACT

A measurement error of a water content depends on a phase difference of a low frequency. The low frequency is a lower one of two frequencies in an alternating current signal used for calculating an impedance of a cell. The phase difference is a difference between a phase of a current value of an alternating current signal applied to a fuel cell stack and a phase of a voltage value of output current. The calculated value of the water content is not used when the phase difference of the low frequency indicates that the measurement error may largely fluctuate.

12 Claims, 9 Drawing Sheets

FUEL CELL SYSTEM

CROSS-REFERENCE TO RELATED APPLICATION

The present application claims priority to Japanese Patent Application No. 2017-77228 filed on Apr. 10, 2017, the contents of which are incorporated herein by reference.

BACKGROUND

Field

The present disclosure relates to a fuel cell system.

Description of Related Art

JP2014-203562A discloses a method of applying an alternating current signal to an output current of a fuel cell stack in order to calculate a water content in a fuel cell. The alternating current signal applied in the method disclosed in JP2014-203562A has two frequencies.

The inventors of the present application have found that calculation accuracy of the water content fluctuates depending on some conditions. In view of this, an object of the present disclosure is directed to calculation of a water content taking the accuracy fluctuation into consideration.

SUMMARY

According to one aspect of the present disclosure, a fuel cell system is provided. The fuel cell system comprises: a fuel cell stack configured to include a plurality of cells and to output direct output current; a signal superimposing unit configured to superimpose on the output current an alternating current signal whose current value is controlled, the alternating current signal including alternating current components at a first frequency and a second frequency higher than the first frequency; a voltage measurement unit configured to measure a voltage value of the output current to which the alternating current signal has been applied; a phase difference acquisition unit configured to acquire a phase difference between a phase of the first frequency of the current value in the alternating current signal and a phase of the first frequency of the voltage value measured by the voltage measurement unit; a calculation unit configured to calculate an amount of water in at least one of the plurality of cells by using the alternating current signal; and a use determination unit configured to determine not to use a calculation result obtained by the calculation unit when at least a condition of an absolute value of the phase difference being larger than a first absolute value and a condition of the absolute value of the phase difference being smaller than a fourth absolute value is satisfied, and determine to use the calculation result obtained by the calculation unit when the absolute value of the phase difference is within a range between a second absolute value smaller than the first absolute value and a third absolute value larger than the fourth absolute value.

The calculation result obtained by the calculation unit largely fluctuates when the phase difference is smaller than the first absolute value or is larger than the fourth absolute value. The calculation result obtained by the calculation unit does not largely fluctuate when the phase difference is within the range between the second absolute value and the third absolute value. According to this aspect, the calculation result is used when the fluctuation is small, and it is prevented from being used when the fluctuation is large.

In the above-described aspect, the fuel cell system may further comprise a current measurement unit configured to measure a current value of the output current to which the alternating current signal has been applied, and the calculation unit may be configured to calculate an amount of water in the fuel cell stack as a whole by obtaining impedance corresponding to the first frequency and impedance corresponding to the second frequency by using measurement results obtained by the current measurement unit and the voltage measurement unit. According to this aspect, a water content of the entire fuel cell stack will be calculated.

According to another aspect of the present disclosure, a fuel cell system is provided. The fuel cell system comprises: a fuel cell stack configured to include a plurality of cells and to output direct output current; a signal superimposing unit configured to superimpose on the output current an alternating current signal whose voltage value is controlled, the alternating current signal including alternating current components at a first frequency and a second frequency higher than the first frequency; a current measurement unit configured to measure a current value of the output current to which the alternating current signal has been applied; a phase difference acquisition unit configured to acquire a phase difference between a phase of the first frequency of a voltage value in the alternating current signal and a phase of the first frequency of the current value measured by the current measurement unit; a calculation unit configured to calculate an amount of water in at least one of the plurality of cells by using the alternating current signal; and a use determination unit configured to determine not to use a calculation result obtained by the calculation unit when at least a condition of an absolute value of the phase difference being larger than a first absolute value and a condition of the absolute value of the phase difference being smaller than a fourth absolute value is satisfied, and determine to use the calculation result obtained by the calculation unit when the absolute value of the phase difference is within a range between a second absolute value smaller than the first absolute value and a third absolute value larger than the fourth absolute value. According to this aspect, the calculation result is used when the fluctuation is small, and it is prevented from being used when the fluctuation is large.

In the above-described aspect, the fuel cell system may further comprise a voltage measurement unit configured to measure a voltage value of the output current to which the alternating current signal has been applied, wherein the calculation unit may be configured to calculate an amount of water in the fuel cell stack as a whole by obtaining impedance corresponding to the first frequency and impedance corresponding to the second frequency by using measurement results obtained by the current measurement unit and the voltage measurement unit According to this aspect, a water content of the entire fuel cell stack will be calculated.

In the above-described aspect, the fuel cell system may further comprise a cell current measurement unit configured to acquire a current value of current through a part of the plurality of cells; and a cell voltage measurement unit configured to measure a voltage value of voltage across the part of the plurality of cells, wherein the calculation unit may be configured to calculate an amount of water in the part of the cells based on measurement results obtained by the cell current measurement unit and the cell voltage measurement unit. According to this aspect, a water content of a part of the cells will be calculated.

In the above-described aspect, the use determination unit may be configured to determine to use the calculation result obtained by the calculation unit while low power generation is being performed, when the absolute value of the phase difference is within a range between the third absolute value and the fourth absolute value. According to this aspect, the calculation result obtained by the calculation unit is used while low power generation is being performed, when the absolute value of the phase difference is within a range between the third absolute value and the fourth absolute value.

In the above-described aspect, the use determination unit may be configured to determine to use the calculation result obtained by the calculation unit while scavenging is being performed, when the absolute value of the phase difference is within a range between the third absolute value and the fourth absolute value. According to this aspect, the calculation result obtained by the calculation unit is used while scavenging is being performed, when the absolute value of the phase difference is within a range between the third absolute value and the fourth absolute value.

In the above-described aspect, the use determination unit may be configured to determine to use the calculation result obtained by the calculation unit while high power generation is being performed, when the absolute value of the phase difference is within a range between the first absolute value and the second absolute value. According to this aspect, the calculation result obtained by the calculation unit is used while high power generation is being performed, when the absolute value of the phase difference is within a range between the first absolute value and the second absolute value.

The present disclosure can be implemented in various aspects other than the above-described aspects. For example, the present disclosure can be implemented in such aspects as a method for calculating a water content, a program for implementing the method, a non-transitory recording medium storing the program, and the like.

DESCRIPTION OF EMBODIMENTS

Figure 1:
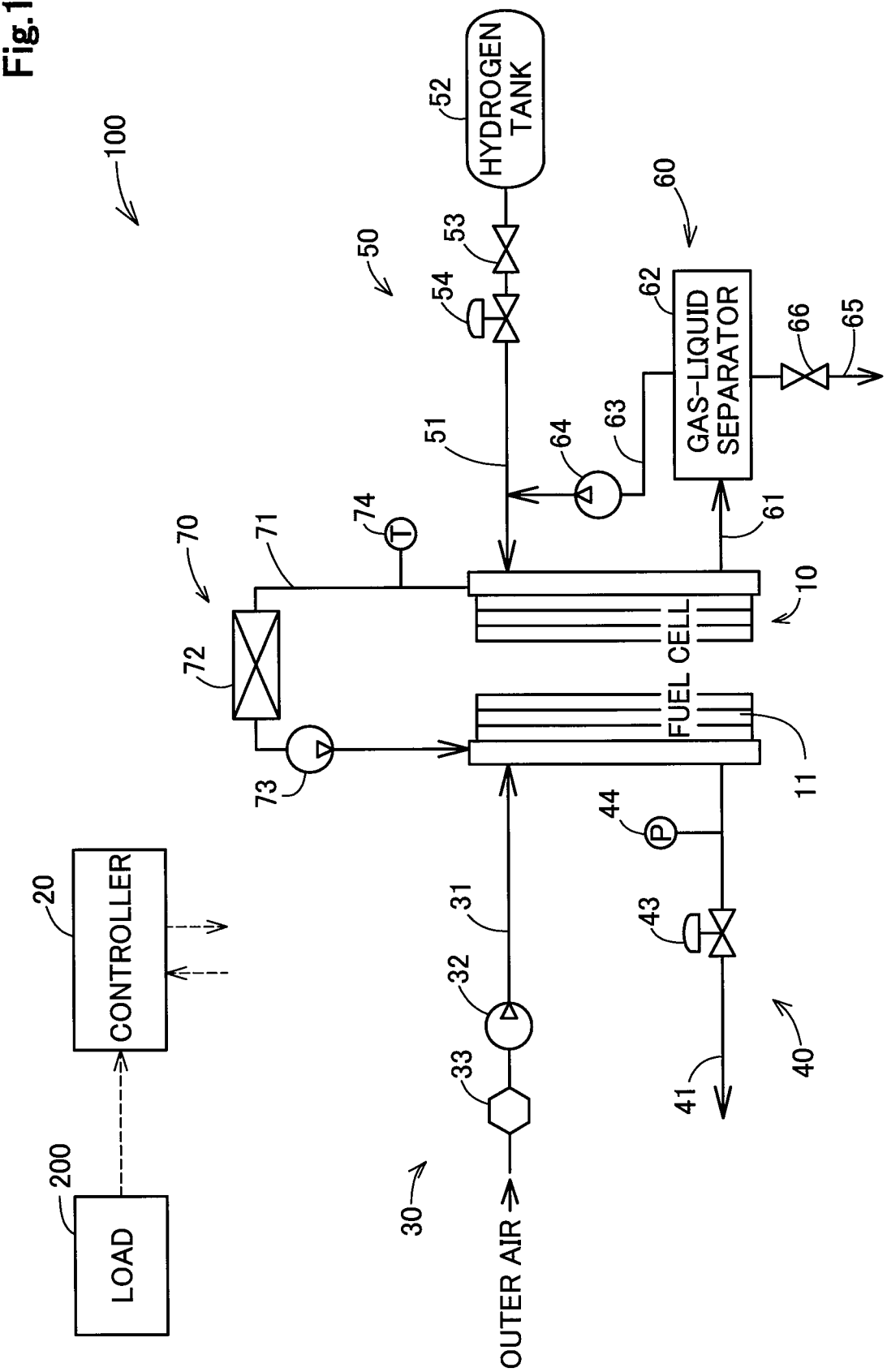
FIG. 1 is a diagram schematically illustrating a configuration of a fuel cell system.

A first embodiment is described. FIG. 1 is a diagram schematically illustrating a configuration of a fuel cell system 100. The fuel cell system 100 includes a fuel cell stack 10, a controller 20, a cathode gas supply unit 30, a cathode gas discharge unit 40, an anode gas supply unit 50, an anode gas circulating/discharging unit 60, and a coolant supply unit 70.

The fuel cell stack 10 is a solid polymer fuel cell that generates power upon receiving hydrogen (anode gas) and air (cathode gas) supplied as reaction gases. The fuel cell stack 10 has a stack structure with a plurality of cells 11 stacked. Each of the cells 11 includes a membrane electrode assembly and two separators. The membrane electrode assembly is a power generator having an electrolyte membrane with both surfaces provided with electrodes. The separators sandwich the membrane electrode assembly.

The electrolyte membrane includes a thin solid polymer membrane exhibiting excellent proton conductivity under a wet condition. The electrodes include carbon. A platinum catalyst, for promoting power generation reaction, is held at an interface between the electrode and the electrolyte membrane. Each of the cells 11 is provided with manifolds (not illustrated) for the reaction gases and a coolant. The reaction gases in the manifolds are supplied to a power generation region of each of the cells 11 through gas flow paths provided to the cell 11.

The controller 20 receives a power generation request from a load 200, and controls components of the fuel cell system 100 described later so that output current is output from the fuel cell stack 10 in response to the request.

The cathode gas supply unit 30 includes a cathode gas pipe 31, an air compressor 32, and an air flow meter 33. The cathode gas pipe 31 is a pipe connected to a cathode side of the fuel cell stack 10. The air compressor 32 is connected to the fuel cell stack 10 through the cathode gas pipe 31, and supplies air, as a result of compressing outer air that has been taken in, to the fuel cell stack 10. This air serves as cathode gas.

The air flow meter 33 is on an upstream side of the air compressor 32 and measures the amount of the outer air taken in by the air compressor 32. A measurement value, obtained by the measurement, is transmitted to the controller 20. The controller 20 drives the air compressor 32 based on the measurement value, to control the amount of air supplied to the fuel cell stack 10 in association with power supplied to the load 200.

The cathode gas discharge unit 40 includes a cathode discharge gas pipe 41, a pressure adjustment valve 43, and a pressure measurement unit 44. The cathode discharge gas pipe 41, through which cathode discharge gas is discharged to the outside the fuel cell system 100, is connected to the cathode side of the fuel cell stack 10. The pressure adjustment valve 43 adjusts the pressure of the cathode discharge gas in the cathode discharge gas pipe 41 (back pressure of the fuel cell stack 10). The pressure measurement unit 44 is on an upstream side of the pressure adjustment valve 43, and measures the pressure of the cathode discharge gas. A measurement value, obtained by the measurement, is transmitted to the controller 20. The controller 20 adjusts the aperture of the pressure adjustment valve 43 based on the measurement value obtained by the pressure measurement unit 44.

The anode gas supply unit 50 includes an anode gas pipe 51, a hydrogen tank 52, an on-off valve 53, and a regulator 54. The hydrogen tank 52 is connected to the anode of the fuel cell stack 10 through the anode gas pipe 51, and is filled with hydrogen to be supplied to the fuel cell stack 10.

The on-off valve 53 and the regulator 54 are provided to the anode gas pipe 51 in this order from the upstream side or from the side closer to the hydrogen tank 52. The on-off valve 53 is opened and closed responsive to an instruction from the controller 20 so as to control the flow of the hydrogen from the hydrogen tank 52. The regulator 54 is a pressure reducing valve for adjusting the pressure of the hydrogen. The controller 20 controls the aperture of the regulator 54.

The anode gas circulating/discharging unit 60 includes an anode discharge gas pipe 61, a gas-liquid separator 62, an anode gas circulation pipe 63, a hydrogen circulation pump 64, an anode water discharge pipe 65, and a water discharge valve 66. The anode discharge gas pipe 61 connects an outlet of the anode of the fuel cell stack 10 and the gas-liquid separator 62 to each other, and guides anode discharge gas, including unreacted gas (such as hydrogen and nitrogen) that has not been used in the power generation reaction, to the gas-liquid separator 62.

The gas-liquid separator 62 is connected to the anode gas circulation pipe 63 and the anode water discharge pipe 65. The gas-liquid separator 62 separates the anode discharge gas into a gas component and water that are respectively guided to the anode gas circulation pipe 63 and the anode water discharge pipe 65.

The anode gas circulation pipe 63 is connected to the anode gas pipe 51. The anode gas circulation pipe 63 is provided with the hydrogen circulation pump 64 that pumps hydrogen, in the gas component as a result of the separation by the gas-liquid separator 62, to the anode gas pipe 51. In this manner, the fuel cell system 100 makes the hydrogen in the anode discharge gas circulated to be supplied to the fuel cell stack 10 again. Thus, hydrogen is more efficiently used.

The water, as a result of the separation by the gas-liquid separator 62, is discharged to the outside of the fuel cell system 100 through the anode water discharge pipe 65. The water discharge valve 66 is provided to the anode water discharge pipe 65 and opens and closes responsive to an instruction from the controller 20. The controller 20 keeps the water discharge valve 66 closed during a normal operation of the fuel cell system 100, and opens the water discharge valve 66 at a predetermined water discharge timing set in advance or a timing for discharging inert gas in the anode discharge gas.

The coolant supply unit 70 includes a coolant pipe 71, a radiator 72, a coolant circulation pump 73, and a coolant temperature measurement unit 74. The coolant pipe 71, through which a coolant for cooling the fuel cell stack 10 circulates, connects an inlet manifold and an outlet manifold for the coolant, provided to the fuel cell stack 10. The radiator 72 is provided to the coolant pipe 71, and cools the coolant through heat exchange between the coolant flowing in the coolant pipe 71 and outer air.

The coolant circulation pump 73 is provided more on a downstream side than the radiator 72 (to be closer to a coolant inlet of the fuel cell stack 10) on the coolant pipe 71, and pumps the coolant cooled by the radiator 72 to the fuel cell stack 10. The coolant temperature measurement unit 74 is provided close to a coolant outlet of the fuel cell stack 10, on the coolant pipe 71, and transmits the measurement value to the controller 20. The controller 20 detects an operation temperature of the fuel cell stack 10 based on the measurement value from the coolant temperature measurement unit 74. The controller 20 controls the radiator 72 and the coolant circulation pump 73 based on the detection result to adjust the temperature of the fuel cell stack 10.

Figure 2:
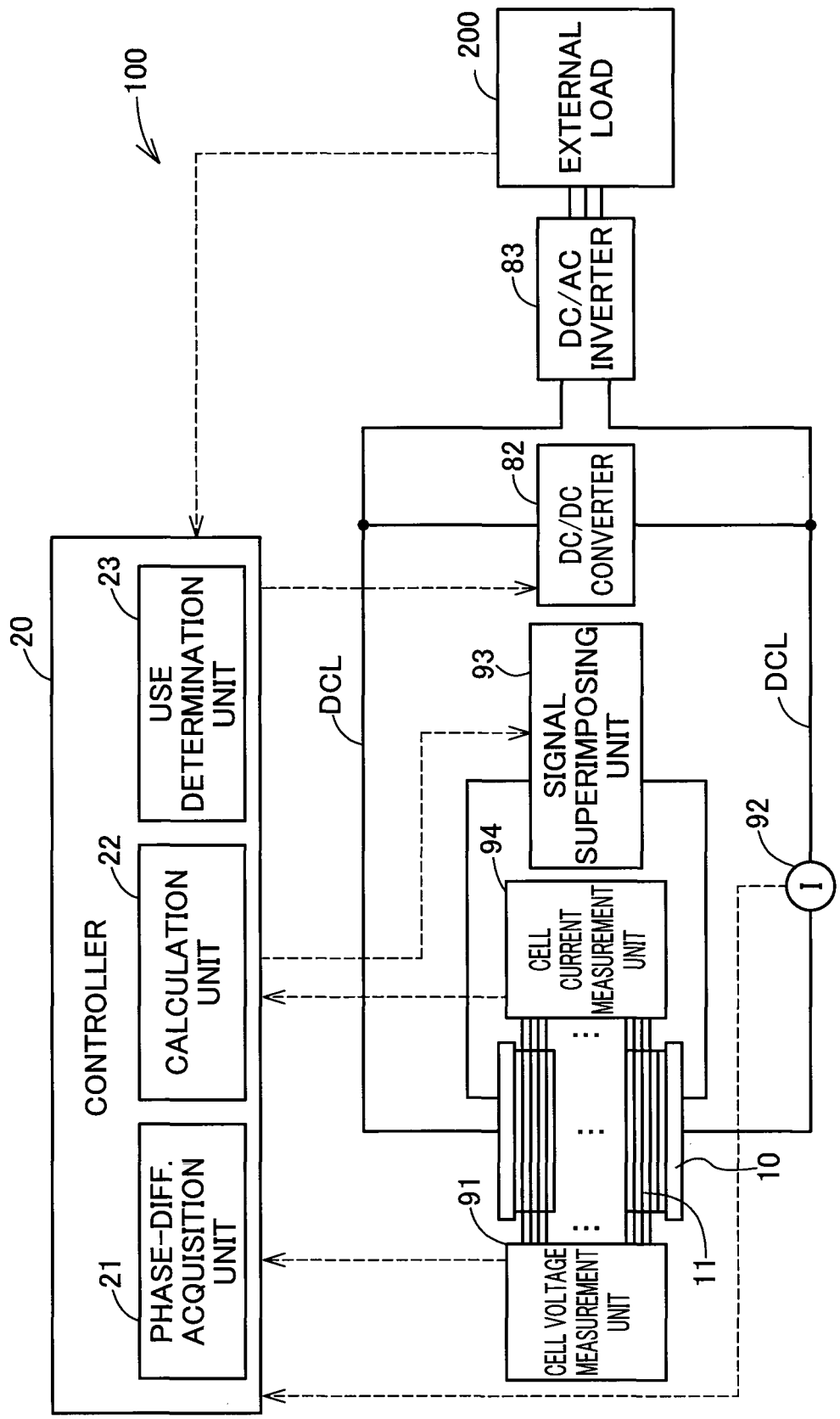
FIG. 2 is a diagram schematically illustrating an electrical configuration of the fuel cell system.

FIG. 2 is a diagram schematically illustrating an electrical configuration of the fuel cell system 100. The fuel cell system 100 includes a DC/DC converter 82, a DC/AC inverter 83, a cell voltage measurement unit 91, a current measurement unit 92, a signal superimposing unit 93, and a cell current measurement unit 94.

The fuel cell stack 10 is connected to the DC/AC inverter 83 through direct current power lines DCL. The DC/AC inverter 83 is connected to the load 200.

The DC/DC converter 82 measures a voltage value of the output current, and inputs the measurement result to the controller 20. The DC/DC converter 82 adjusts a voltage level of the direct current power lines DCL responsive to an instruction from the controller 20. The DC/AC inverter 83 converts the direct current power, obtained from the fuel cell stack 10, into alternating current power, and supplies the power to the load 200.

The cell voltage measurement unit 91 is connected to each of the cells 11 of the fuel cell stack 10, and measures a voltage value or cell voltage of each of the cells 11. The cell voltage measurement unit 91 transmits the measurement result thus obtained to the controller 20.

The current measurement unit 92 is connected to the direct current power lines DCL, measures a current value of the output current from the fuel cell stack 10, and transmits the value thus obtained to the controller 20. The cell current measurement unit 94 is connected to each of the cells 11 of the fuel cell stack 10, and measures a local current value of each of the cells 11. The cell current measurement unit 94 transmits the measurement result thus obtained to the controller 20.

Figure 3:
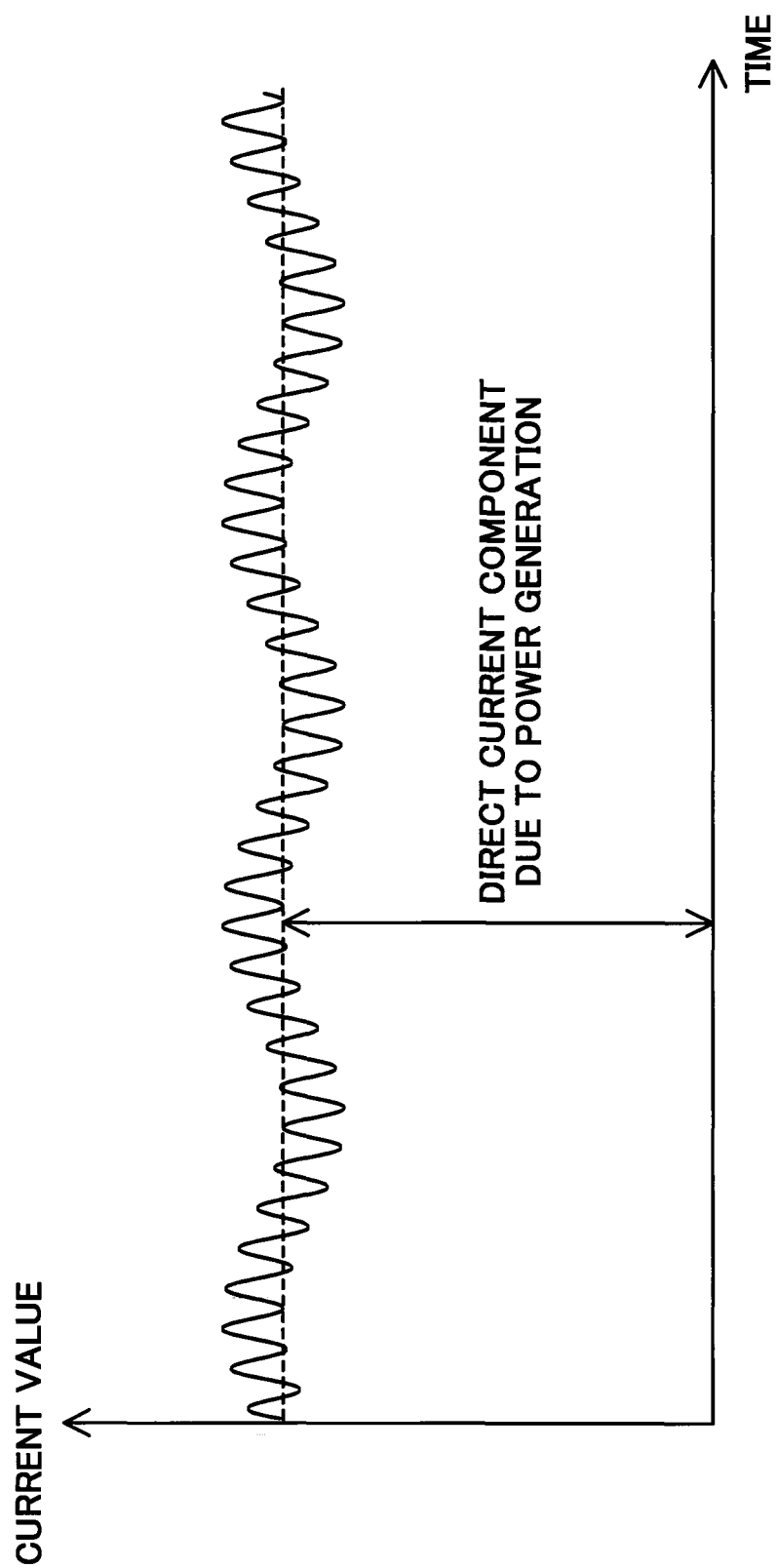
FIG. 3 is a graph illustrating how current of output current and an alternative current signal changes over time.

The signal superimposing unit 93 superimposes an alternating current signal on the output current from the fuel cell stack 10. FIG. 3 is a graph illustrating how the current value of the output current, to which the alternating current signal is applied, changes over time. The alternating current signal superimposed by the signal superimposing unit 93 has a current value controlled.

The signal superimposing unit 93 determines a frequency of the alternating current component responsive to an instruction from the controller 20. Two frequencies are determined for the alternating current component based on the instruction from the controller 20. Thus, the alternating current component has two frequency components as can be seen from FIG. 3. The two frequencies include a lower frequency referred to as a low frequency $f_L$ and a higher frequency referred to as a high frequency $f_H$. For example, the low frequency $f_L$ is 1 to 150 Hz. The low frequency $f_L$ may be 50 Hz when a phase difference described later is within a range between B and C. For example, the high frequency $f_H$ is 200 Hz or higher. Thus, the high frequency hi and the low frequency $f_L$ are referred to as high and low simply because of their relative relationship, and do not necessarily correspond to general terms of "high frequency" and "low frequency".

The controller 20 calculates an impedance for each of the cells 11, based on the measurement values from the cell voltage measurement unit 91 and the cell current measurement unit 94. The impedance is calculated for each of the low frequency $f_L$ and the high frequency $f_H$. The controller 20 includes a phase difference acquisition unit 21 configured to acquire a phase difference between a current and a voltage of an alternating signal, a calculation unit. 22 configured to calculate an amount of water in the cells 11 by using the alternating signal, and a use determination unit 23 configured to determine whether not to use the calculation result of the calculation unit 22.

Figure 4:
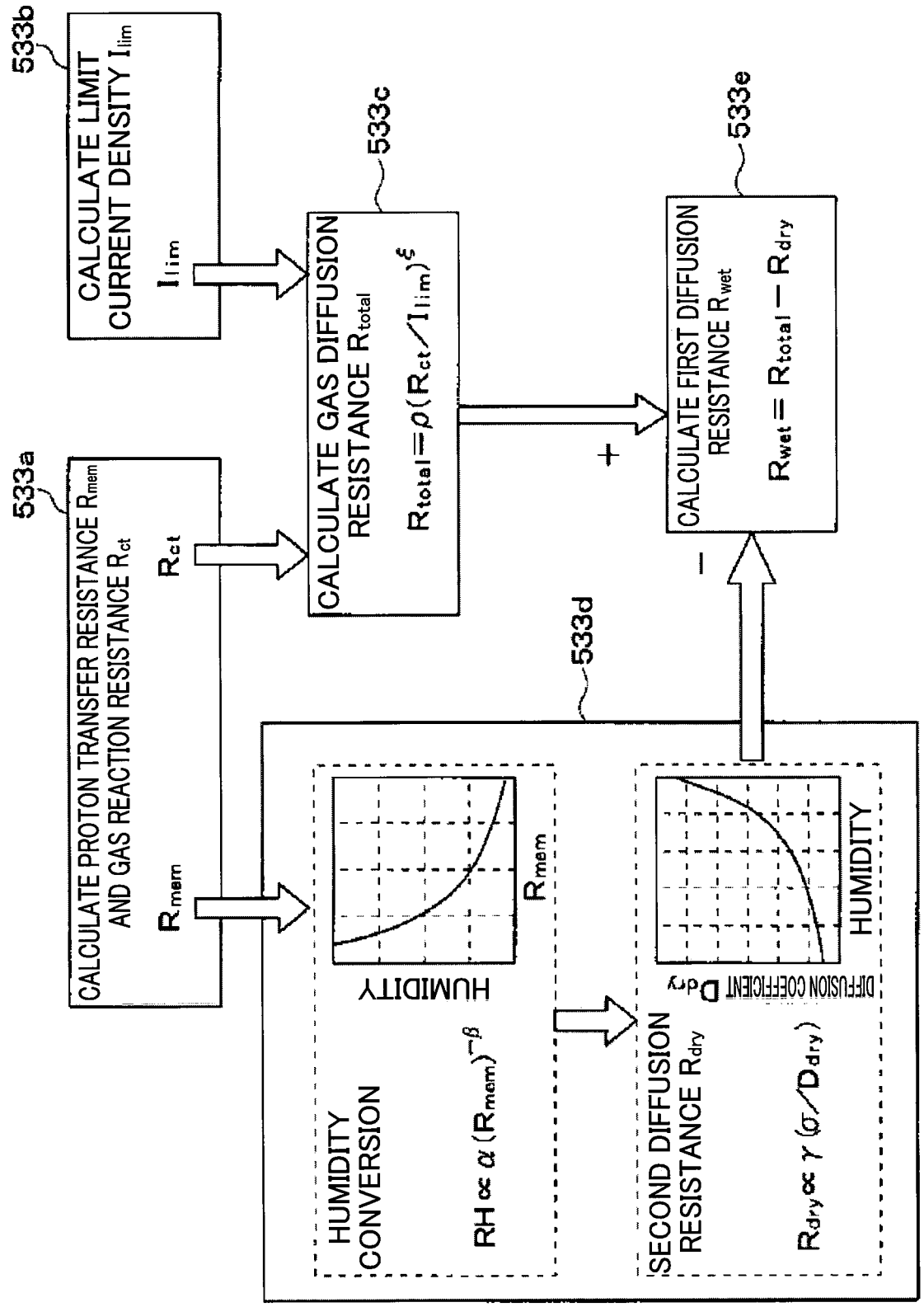
FIG. 4 is a functional block diagram illustrating how a first diffusion resistance is calculated.

FIG. 4 is a functional block diagram illustrating how a first diffusion resistance $R_{wet}$ is calculated. The first diffusion resistance $R_{wet}$ is a parameter in unit of [s/m], indicating diffusion characteristics depending on flooding or water content in the fuel cell stack 10. The first diffusion resistance $R_{wet}$ is used for calculating a water content described later.

The functional blocks for calculating the first diffusion resistance $R_{wet}$ include a resistance calculation unit 533a, a limit current density calculation unit 533b, a gas diffusion resistance calculation unit 533c, a second diffusion resistance calculation unit 533d, and a first diffusion resistance calculation unit 533e. The controller 20 implements these functions by executing a computer program.

The resistance calculation unit 533a calculates a proton transfer resistance $R_{mem}$ and a gas reaction resistance $R_{ct}$ for each of the cells 11. The proton transfer resistance $R_{mem}$ is a component obtained by converting a resistance overvoltage. The resistance overvoltage increases as the electrolyte membrane dries. The gas reaction resistance $R_{ct}$ is a component obtained by converting an activation overvoltage and a concentration overvoltage.

The resistance calculation unit 533a calculates the proton transfer resistance $R_{mem}$ based on an impedance at the high frequency $f_H$. The resistance calculation unit 533a calculates the gas reaction resistance $R_{ct}$ by using an impedance at the low frequency $f_L$ and the proton transfer resistance $R_{mem}$.

Figure 5:
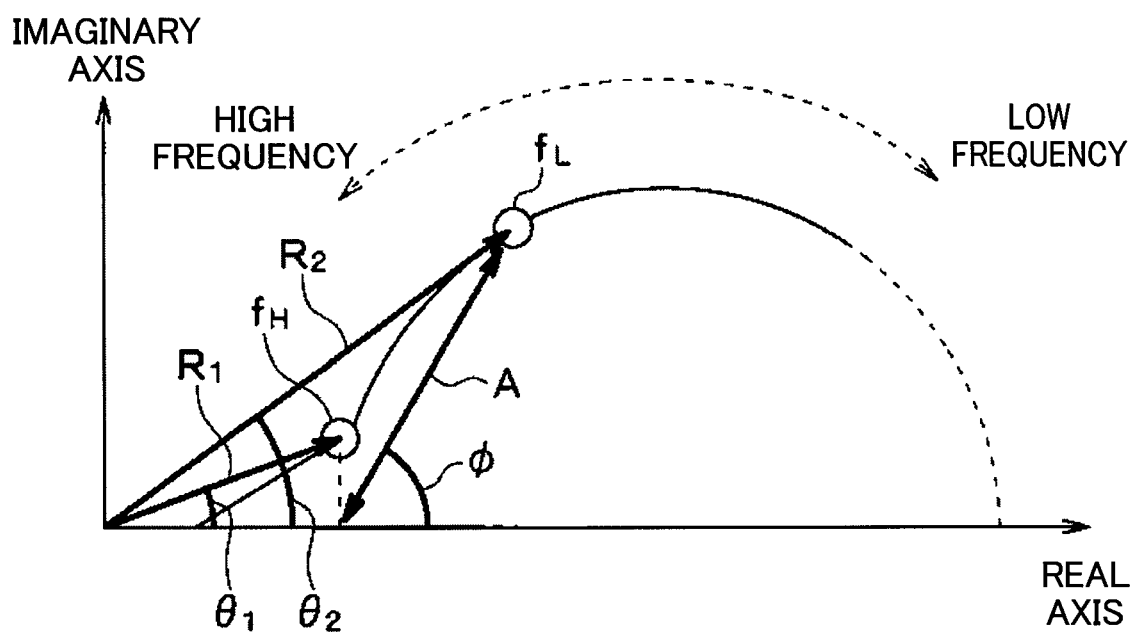
FIG. 5 is a diagram illustrating Cole-Cole plot.
Figure 6:
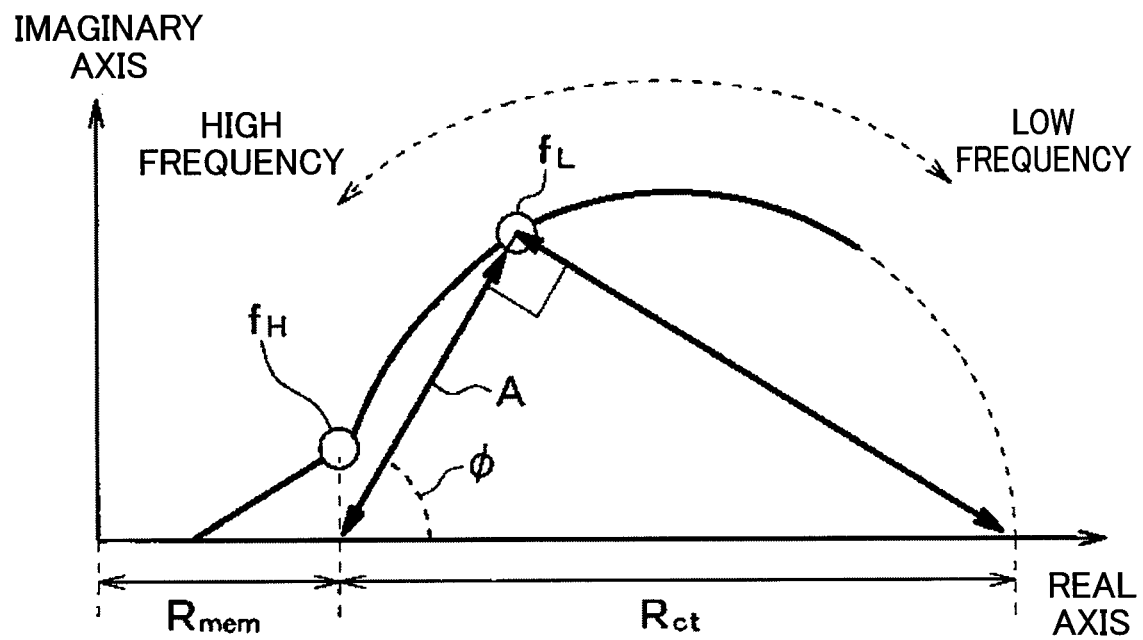
FIG. 6 is a diagram illustrating Cole-Cole plot.

How the proton transfer resistance $R_{mem}$ and the gas reaction resistance $R_{ct}$ are calculated is described below with reference to FIG. 5 and FIG. 6. FIG. 5 and FIG. 6 are diagrams illustrating Cole-Cole plots. Cole-Cole plots are characteristic diagrams illustrating relationship between a frequency and an impedance on a complex plane.

As shown in FIG. 6, a value in a real axis of the impedance at the high frequency $f_H$ corresponds to the proton transfer resistance $R_{mem}$, and a value between two cross portions of the trace of the impedance curve having an arc shape and the real axis corresponds to the gas reaction resistance $R_{ct}$.

Specifically, the proton transfer resistance $R_{mem}$ is calculated based on an absolute value $R_1$ and a phase $\theta_1$ of the impedance at the high frequency $f_H$ by using the following equation F1.

$$R_{mem} = R_1 \cos \theta_1 \qquad (F1)$$

Component $\varphi$ and A showing the characteristics of the gas reaction resistance $R_{ct}$, in the impedance at the low frequency $f_L$ are calculated based on the absolute value $R_1$ and an absolute value $R_2$ of the impedance respectively at the high and the low frequencies $f_H$ and $f_L$, and a phase $\theta_2$ by using the following equations F2 and F3.

$$\varphi = \tan^{-1}[(R_2 \sin \theta_2)/\{(R_2 \cos \theta_2) - R_{mem}\}] \qquad (F2)$$

$$A = (R_2 \sin \theta_2)/(\sin \varphi) \qquad (F3)$$

The gas reaction resistance $R_{ct}$ is calculated based on the calculated values $\varphi$ and A (which are obtained by the equations F2 and F3 described above) by using the following equation F4.

$$R_{ct} = A/\cos \varphi \qquad (F4)$$

The limit current density calculation unit 533b calculates a limit current density $I_{lim}$. Specifically, the limit current density $I_{lim}$ is calculated by the following equations F5 to F9.

$$I_{lim} = \{e^{\beta}/(e^{\beta}-1)\}I \qquad (F5)$$

$$\beta = (\eta_c n F)/(2RT) \qquad (F6)$$

$$\eta_c = Eo - E - \eta_a - \eta_R \qquad (F7)$$

$$\eta_a = \{(RT)/(2\alpha F)\} \ln(I/Io) \qquad (F8)$$

$$\eta_R = I R_{mem} \qquad (F9)$$

In the equations F5 to F9, "F" indicates the Faraday constant, "R" indicates a gas constant, "T" indicates a temperature, "n" indicates a constant, "I" indicates a current density, "Io" indicates an exchange current density, "E" indicates a control voltage, "Eo" indicates a theoretical electromotive voltage, "$\eta_c$" indicates a concentration overvoltage, "$\eta_a$" indicates an activation overvoltage, "$\eta_R$" indicates a resistance overvoltage, and "$\alpha$" indicates an electric charge moving coefficient (a constant).

The gas diffusion resistance calculation unit 533c calculates a gas diffusion resistance $R_{total}$ which is a parameter in unit of [s/m] indicating a difficulty to diffuse the reaction gas to the catalyst layers. The gas diffusion resistance $R_{total}$ contains the first diffusion resistance $R_{wet}$ and a second diffusion resistance $R_{dry}$, that is, $R_{total} = R_{wet} + R_{dry}$. The second diffusion resistance $R_{dry}$ indicates diffusion characteristics depending on the dried-up.

The gas diffusion resistance calculation unit 533c calculates the gas diffusion resistance $R_{total}$ based on a mathematical function stored in advance. This mathematical function is obtained as a functional model regarding the correlation characteristics of the gas diffusion resistance $R_{total}$, the limit current density $I_{lim}$, and the gas reaction resistance $R_{ct}$. Specifically, the gas diffusion resistance calculation unit 533c according to the present embodiment calculates the gas diffusion resistance $R_{total}$ based on the limit current density $I_{lim}$ and the gas reaction resistance $R_{ct}$ by using the following equation F10.

$$R_{total} = \rho(I_{lim}/R_{ct})^{\xi} \qquad (F10)$$

The values $\rho$ and $\xi$ in the equation F10 are constant values obtained by fitting actually measured values and estimated values of the gas diffusion resistance and the estimated gas diffusion resistance. The actually measured values of the gas diffusion resistance are measured in advance based on the limit current density when the gas concentration of the reaction gas in the cell 11 is varied. The estimated gas diffusion resistance is calculated by the gas reaction resistance $R_{ct}$ and the limit current density $I_{lim}$.

The equation F10 described above is one example of a mathematical functional model regarding the correlation characteristics. Equation F10 is obtained by defining each of the gas reaction resistance $R_{ct}$ and the limit current density $I_{lim}$ as a function of the gas diffusion resistance $R_{total}$ and a gas concentration of the reaction gas, and deleting terms concerning the gas concentration of the reaction gas from of these functions.

The second diffusion resistance calculation unit 533d calculates the second diffusion resistance $R_{dry}$. Similar to the proton transfer resistance $R_{mem}$, the second diffusion resistance $R_{dry}$ has characteristics of increasing according to the reduction of the humidity RH in the fuel cell stack 10. The proton transfer resistance $R_{mem}$ has a correlation to the humidity RH, as shown in the following equation F11. Further, the second diffusion resistance $R_{dry}$ is in proportion to the reciprocal value of a diffusion coefficient $D_{dry}$, which has a correlation to the humidity RH, as shown in the following equation F12.

$$RH \propto B(R_{mem})^C \qquad (F11)$$

$$R_{dry} \propto D(\sigma/D_{dry}) \qquad (F12)$$

Signs "B" and "C" used in the equation F11 indicate constant values and "D" and "$\sigma$" used in the equation F12 respectively indicate a constant value and a thickness of the diffusion layer in the cell 11.

The second diffusion resistance calculation unit 533*d* calculates the humidity RH in the fuel cell stack 10 based on the proton transfer resistance $R_{mem}$ by using a control map. This control map is stored in advance, and defines the correlation between the proton transfer resistance $R_{mem}$ and the humidity RH.

The second diffusion resistance calculation unit 533*d* calculates the second diffusion resistance $R_{dry}$ based on the humidity RH that has been calculated by using the equation F12 and a control map. This control map is stored in advance, and defines the correlation between the humidity RH and the diffusion coefficient $D_{dry}$.

The first diffusion resistance calculation unit 533*e* subtracts the second diffusion resistance $R_{dry}$ from the gas diffusion resistance $R_{total}$, and obtains the subtraction result as the first diffusion resistance $R_{wet}$ (=$R_{total}$−$R_{dry}$). Next, how the water content is calculated by using the first diffusion resistance $R_{wet}$ is described.

Figure 7:
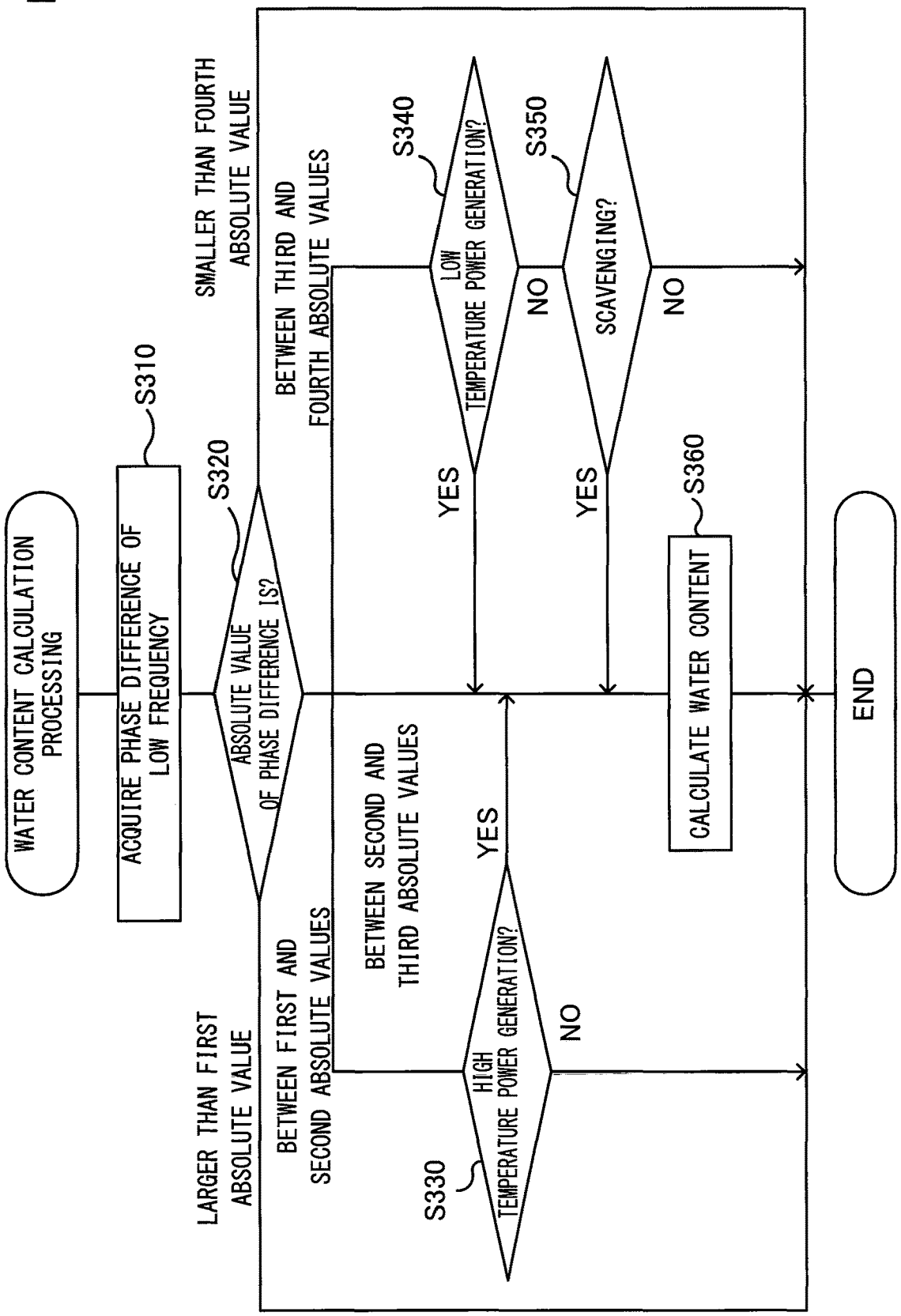
FIG. 7 is a flowchart illustrating water content calculation processing.

FIG. 7 is a flowchart illustrating water content calculation processing executed by the controller 20. The controller 20 periodically executes the water content calculation processing while the fuel cell system 100 is operating.

First of all, a phase difference of the low frequency $f_L$ is acquired (S310). The phase difference of the low frequency $f_L$ is hereinafter simply referred to as a "phase difference". The phase difference is a difference obtained by subtracting the phase of the low frequency $f_L$ measured by the DC/DC converter 82 from the phase of the low frequency $f_L$ of the signal superimposed by the signal superimposing unit 93. The DC/DC converter 82 measures voltages, and thus the low frequency $f_L$ measured by the DC/DC converter 82 is measured as an alternating current component of the voltage value.

Figure 8:
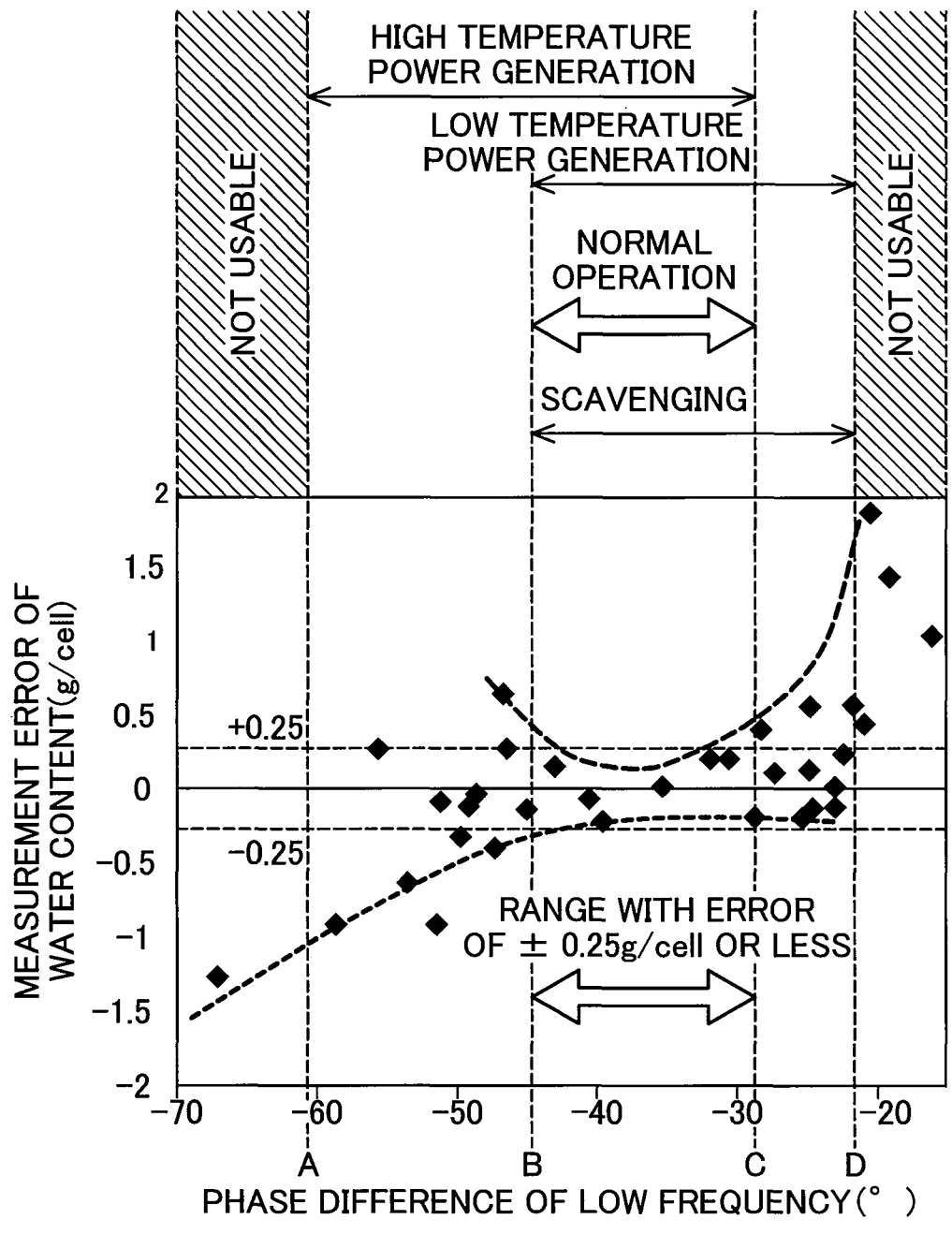
FIG. 8 is a graph illustrating a result of an experiment for examining relationship between a water content measurement error and a phase difference.

Next, it is determined in which range the phase difference exists (S320). FIG. 8 is a graph illustrating a result of an experiment for examining relationship between a water content measurement error and the phase difference. The water content measurement error is a difference obtained by subtracting an actually measured value of a water content from a value of the water content calculated from the first diffusion resistance $R_{wet}$. The water content as used herein is a mass of water in a single cell 11.

The water content W is calculated from the first diffusion resistance $R_{wet}$ by using the following equation F13.

$$W = 10^8 R_{wet}^4 - 10^{-7} R_{wet}^3 - 10^{-5} R_{wet}^2 + 7 R_{wet}^{-4} \quad (F13)$$

The equation F13 is an approximation equation obtained based on the actually measured values of the water content in the cell 11 obtained with the first diffusion resistance $R_{wet}$ changed in the cell 11.

The measurement error is within a range of ±0.25 g/cell, when the phase difference is within the range between B (−45° in the present embodiment) and C (−29° in the present embodiment), as illustrated in FIG. 8. Thus, when the phase difference is within the range between B and C, the water content can be accurately calculated by using the equation F13. In the present embodiment, an absolute value of B is referred to as a second absolute value, and an absolute value of C is referred to as a third absolute value. Similarly, an absolute value of A is referred to as a first absolute value, and an absolute value of D is referred to as a fourth absolute value.

In the present embodiment, the water content is calculated (S360) and the water content calculation processing is terminated, when the phase difference is within the range between B and C, that is, when the absolute value of the phase difference is within a range between the second absolute value and the third absolute value (S320, between second absolute value and third absolute value).

It is determined whether the high temperature power generation is being performed (S330), when the phase difference is within a range between A and B, that is, when the absolute value of the phase difference is within a range between the first absolute value and the second absolute value (S320, between first absolute value and second absolute value). In S330, it is determined that the high temperature power generation is being performed if the measurement value obtained by the coolant temperature measurement unit 74 is equal to or higher than a reference temperature T1, and it is determined that the high temperature power generation is not being performed if the measurement value obtained by the coolant temperature measurement unit 74 is lower than the reference temperature T1.

When the high temperature power generation is being performed (S330, YES), the processing proceeds to step S360 in which the water content is calculated. When the high temperature power generation is not being performed (S330, NO), the water content calculation processing is terminated without executing step S360.

The high temperature power generation is likely to promote drying. Thus, there is high requirement for the calculation of the water content while the high temperature power generation is being performed; however, if the calculated water content is much larger than an actual water content, this results in erroneous determination indicating WET even when the actual status is DRY. Thus, it is advisable not to rely on the calculated water content under a condition that is likely to result in a larger value than the actual water content while the high temperature power generation is being performed. The measurement error of a positive value indicates that a value larger than the actual water content is calculated. The measurement error is likely to be a positive value when the phase difference is larger than C, that is, when the absolute value of the phase difference is smaller than the third absolute value.

Still, even when the measurement error is likely to be a negative value, it is advisable not to relay on the calculated water content under a condition leading to an excessively large absolute value of the measurement error. The absolute value of the measurement error becomes excessively large when the phase difference is smaller than A (−61° in the present embodiment), that is, when the absolute value of the phase difference is larger than the first absolute value. Thus, when the high temperature power generation is being performed, the water content is calculated when the absolute value of the phase difference is within a range between the first absolute value and the third absolute value. It is to be noted that step S330 is executed when the absolute value of the phase difference is within the range between the first absolute value and the second absolute value, because the water content is calculated regardless of whether the high temperature power generation is being performed when the absolute value of the phase difference is within the range between the second absolute value and the third absolute value.

When the phase difference is within a range between C and D (−21° in the present embodiment), that is, when the absolute value of the phase difference is within a range between the third absolute value and the fourth absolute (S320, between third absolute value and fourth absolute value), it is determined whether low temperature power generation is being performed (S340). In step S340, it is determined that the low temperature power generation is being performed when the measurement value obtained by the coolant temperature measurement unit 74 is smaller than a reference temperature T2, and it is determined that the low temperature power generation is not being performed when the measurement value obtained by the coolant temperature measurement unit 74 is equal to or larger than the reference temperature T2. The reference temperature T2 is lower than the reference temperature T1.

When the low temperature power generation is being performed (S340, YES), the processing proceeds to step S360 in which the water content is calculated. When the low temperature power generation is not being performed (S340, NO), whether scavenging is being performed is determined (S350). When the scavenging is being performed (S350, YES), the processing proceeds to step S360 in which the water content is calculated. When the scavenging is not being performed (S350, NO), the water content calculation processing is terminated without executing step S360.

The low temperature power generation is likely to involve flooding. Thus, there is high requirement for the calculation of the water content while the low temperature power generation is being performed; however, if the calculated water content is much smaller than an actual water content, this results in erroneous determination that the flooding is not occurring, even when the flooding is actually occurring. Thus, it is advisable not to rely on the calculated water content under a condition that is likely to result in a value smaller than the actual water content while the low temperature power generation is being performed. The measurement error of a negative value indicates that a value smaller than the actual water content is calculated. The measurement error is likely to be a negative value when the phase difference is smaller than B, that is, when the absolute value of the phase difference is larger than the second absolute value.

Still, even when the measurement error is a positive value, it is advisable not to relay on the calculated water content under a condition leading to an excessively large absolute value of the measurement error. The absolute value of the measurement error becomes excessively large when the phase difference is larger than D, that is, when the absolute value of the phase difference is smaller than the fourth absolute value. Thus, when the low temperature power generation is being performed, the water content is calculated when the absolute value of the phase difference is within a range between the second absolute value and the fourth absolute value. It is to be noted that step S340 is executed when the absolute value of the phase difference is within the range between the third absolute value and the fourth absolute value, because the water content is calculated regardless of whether the low temperature power generation is being performed when the absolute value of the phase difference is within the range between the second absolute value and the third absolute value.

Processing executed when the scavenging is being performed is similar to that executed when the low temperature power generation is being performed because of the following reason. Specifically, the scavenging is executed for discharging water. Thus, the scavenging is likely to require the calculation of the water content, as in the case where the low temperature power generation is being performed. Logically, a calculated value smaller than the actual water content results in insufficient scavenging.

When it is determined in step S320 that the phase difference is smaller than A, that is, when the absolute value of the phase difference is larger than the first absolute value, the absolute value of the measurement error becomes excessively large described above. Thus, the water content calculation processing is terminated without executing step S360, regardless of the operation condition.

Also when it is determined in step S320 that the phase difference is larger than D, that is, when the absolute value of the phase difference is larger than the fourth absolute value, the absolute value of the measurement error becomes excessively large as described above. Thus, the water content calculation processing is terminated without executing step S360, regardless of the operation condition.

Under the normal operation condition, the water content is calculated only when the absolute value of the phase difference is within the range between the second absolute value and the third absolute value. This is because requirement for the calculation of the water content is not so high under the normal operation condition. Thus, the calculation may be executed only under a condition leading to high accuracy.

With the embodiment described above, the phase difference of the low frequency $f_L$ is used to determine that a result of the water content calculation is not used under a condition where the calculated value largely fluctuates.

A second embodiment is described. The second embodiment is described while mainly focusing on a difference from the first embodiment. Matters not described are the same as those in the first embodiment.

Figure 9:
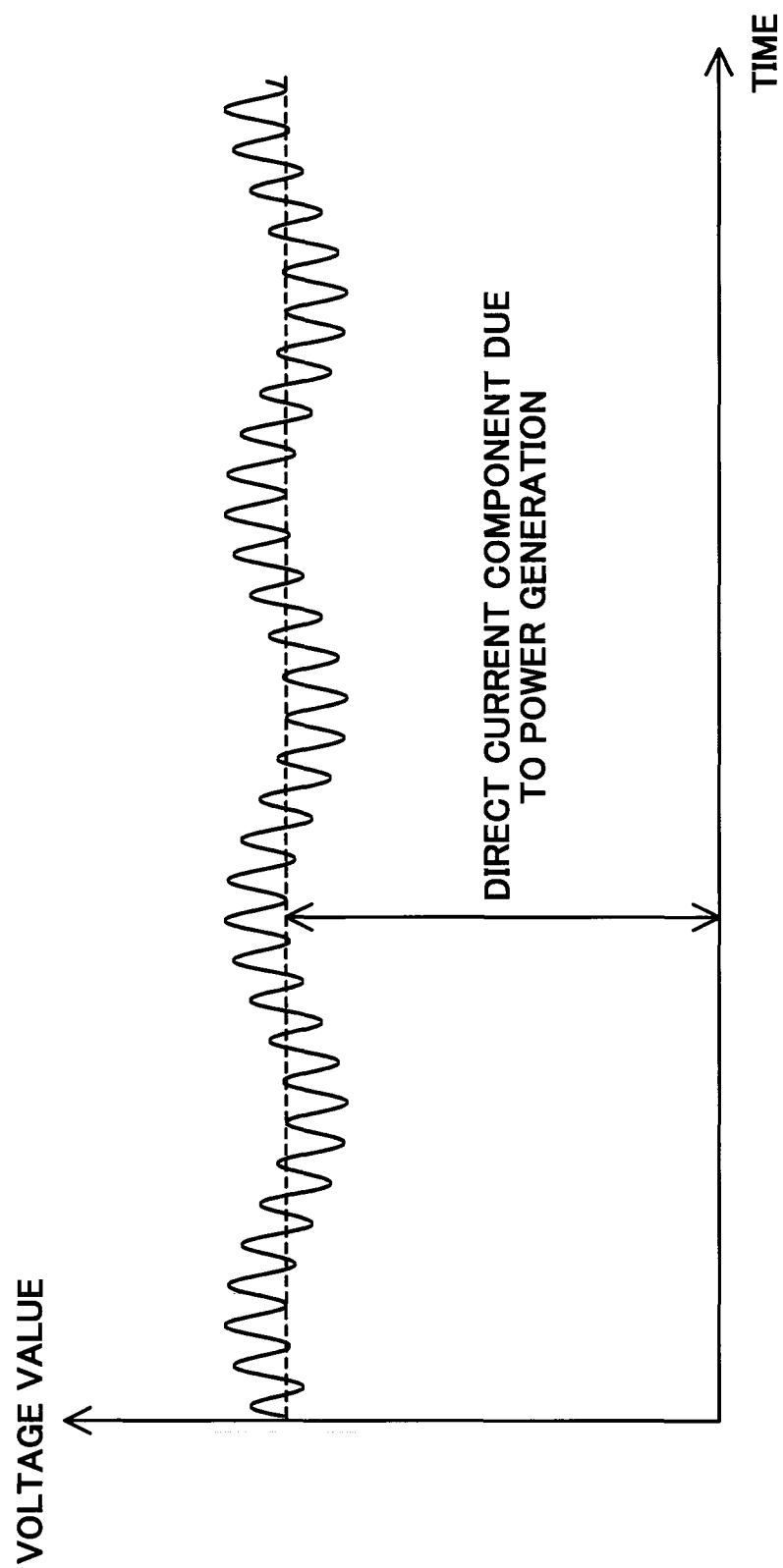
FIG. 9 is a graph illustrating how voltage of the output current and the alternating current signal changes over time.

FIG. 9 is a graph illustrating how a voltage value of the output current, to which the alternating current signal is applied, changes over time. The alternating current signal, superimposed by the signal superimposing unit 93 in the present embodiment, has a voltage value controlled.

In step S310 in the water content calculation processing according to the present embodiment, a difference between a phase of the voltage value of the alternating current signal, superimposed by the signal superimposing unit 93, and a phase of the current value measured by the current measurement unit 92 is acquired.

In the present embodiment, the water content calculation processing may be executed as in the first embodiment, with the first absolute value to the fourth absolute value determined by examining the relationship between the water content measurement error and the phase difference through an experiment.

The present disclosure is not limited to the embodiments, the examples, and the modifications described above, and may be implemented in various ways without departing from the gist of the present disclosure. For example, the technical features in the embodiments, the examples, and the modifications corresponding to the technical features in each aspect described in the summary section may be replaced or combined as appropriate in order to partially or entirely solve the problem described above or to partially or entirely achieve the advantageous effects described above. Some technical features that are not described as being essential herein can be omitted as appropriate. For example, the following aspects can be employed.

The water content may be calculated even under a condition leading to a large fluctuation of the calculated value, as long as the calculated value is not used.

The target of the calculation of the water content is not limited to each single cell 11. For example, the water content may be calculated for each pair of cells 11 or for the entire fuel cell stack 10. When the water content is calculated for the entire fuel cell stack 10, the impedance may be calculated by using the voltage value measured by the DC/DC converter 82 and the current value measured by the current measurement unit 92.

The water content may be calculated for each single cell 11 and for the entire fuel cell stack 10.

The water content may not be calculated even when the high temperature power generation is being performed, if the absolute value of the phase difference is within a range between the first absolute value and the second absolute value.

The water content may not be calculated even when the low temperature power generation or the scavenging is being performed, if the absolute value of the phase difference is within a range between the third absolute value and the fourth absolute value.

The functions and processing implemented with software in the embodiments described above may partially or entirely be implemented with hardware. The functions and processing implemented with hardware may partially or entirely be implemented with software. The hardware may be various circuits including an integrated circuit, a discrete circuit, and a circuit module as a combination of these circuits.

What is claimed is:

1. A fuel cell system comprising:
   a fuel cell stack configured to include a plurality of cells and to output direct output current;
   a signal superimposing circuit configured to superimpose on the output current an alternating current signal whose current value is controlled, the alternating current signal including alternating current components at a first frequency and a second frequency higher than the first frequency;
   a voltage measurement unit configured to measure a voltage value of the output current to which the alternating current signal has been applied; and
   a controller configured to
   acquire a phase difference between a phase of the first frequency of the current value in the alternating current signal and a phase of the first frequency of the voltage value measured by the voltage measurement unit;
   calculate an amount of water in at least one of the plurality of cells by using the alternating current signal;
   determine not to use a calculation result obtained by the controller when at least one of a condition of an absolute value of the phase difference being larger than a first absolute value and a condition of the absolute value of the phase difference being smaller than a fourth absolute value is satisfied, and
   determine to use the calculation result obtained by the controller when the absolute value of the phase difference is within a range between a second absolute value smaller than the first absolute value and a third absolute value larger than the fourth absolute value,
   wherein the first absolute value is larger than the second absolute value, the second absolute value is larger than the third absolute value, and the third absolute value is larger than the fourth absolute value.

2. The fuel cell system in accordance with claim 1 further comprising a current measurement unit configured to measure a current value of the output current to which the alternating current signal has been applied, wherein
   the controller is configured to calculate an amount of water in the fuel cell stack as a whole by obtaining impedance corresponding to the first frequency and impedance corresponding to the second frequency by using measurement results obtained by the current measurement unit and the voltage measurement unit.

3. The fuel cell system in accordance with claim 1 further comprising:
   a cell current measurement unit configured to acquire a current value of current through a part of the plurality of cells; and
   a cell voltage measurement unit configured to measure a voltage value of voltage across the part of the plurality of cells, wherein
   the controller is configured to calculate an amount of water in the part of the cells based on measurement results obtained by the cell current measurement unit and the cell voltage measurement unit.

4. The fuel cell system in accordance with claim 1, wherein the controller is configured to determine to use the calculation result obtained by the controller while low temperature power generation is being performed, when the absolute value of the phase difference is within a range between the third absolute value and the fourth absolute value, the low temperature power generation is performed when the controller determines that a temperature of a coolant of the fuel cell stack is smaller than a reference temperature.

5. The fuel cell system in accordance with claim 1, wherein the controller is configured to determine to use the calculation result obtained by the controller while scavenging is being performed, when the absolute value of the phase difference is within a range between the third absolute value and the fourth absolute value.

6. The fuel cell system in accordance with claim 1, wherein the controller is configured to determine to use the calculation result obtained by the controller while high temperature power generation is being performed, when the absolute value of the phase difference is within a range between the first absolute value and the second absolute value, the high temperature power generation is performed when the controller determines that a temperature of a coolant of the fuel cell stack is larger than a reference temperature.

7. A fuel cell system comprising:
   a fuel cell stack configured to include a plurality of cells and to output direct output current;
   a signal superimposing circuit configured to superimpose on the output current an alternating current signal whose voltage value is controlled, the alternating current signal including alternating current components at a first frequency and a second frequency higher than the first frequency;
   a current measurement unit configured to measure a current value of the output current to which the alternating current signal has been applied; and
   a controller configured to
   acquire a phase difference between a phase of the first frequency of a voltage value in the alternating current signal and a phase of the first frequency of the current value measured by the current measurement unit;
   calculate an amount of water in at least one of the plurality of cells by using the alternating current signal;
   determine not to use a calculation result obtained by the controller when at least one of a condition of an absolute value of the phase difference being larger than a first absolute value and a condition of the absolute value of the phase difference being smaller than a fourth absolute value is satisfied, and
   determine to use the calculation result obtained by the controller when the absolute value of the phase difference is within a range between a second absolute value smaller than the first absolute value and a third absolute value larger than the fourth absolute value, wherein the first absolute value is larger than the second absolute value, the second absolute value is larger than the third absolute value, and the third absolute value is larger than the fourth absolute value.

8. The fuel cell system in accordance with claim 7 further comprising a voltage measurement unit configured to measure a voltage value of the output current to which the alternating current signal has been applied, wherein
the controller is configured to calculate an amount of water in the fuel cell stack as a whole by obtaining impedance corresponding to the first frequency and impedance corresponding to the second frequency by using measurement results obtained by the current measurement unit and the voltage measurement unit.

9. The fuel cell system in accordance with claim 7 further comprising:
a cell current measurement unit configured to acquire a current value of current through a part of the plurality of cells; and
a cell voltage measurement unit configured to measure a voltage value of voltage across the part of the plurality of cells, wherein
the controller is configured to calculate an amount of water in the part of the cells based on measurement results obtained by the cell current measurement unit and the cell voltage measurement unit.

10. The fuel cell system in accordance with claim 7, wherein the controller is configured to determine to use the calculation result obtained by the controller while low temperature power generation is being performed, when the absolute value of the phase difference is within a range between the third absolute value and the fourth absolute value, the low temperature power generation is performed when the controller determines that a temperature of a coolant of the fuel cell stack is smaller than a reference temperature.

11. The fuel cell system in accordance with claim 7, wherein the controller is configured to determine to use the calculation result obtained by the controller while scavenging is being performed, when the absolute value of the phase difference is within a range between the third absolute value and the fourth absolute value.

12. The fuel cell system in accordance with claim 7, wherein the controller is configured to determine to use the calculation result obtained by the controller while high temperature power generation is being performed, when the absolute value of the phase difference is within a range between the first absolute value and the second absolute value, the high temperature power generation is performed when the controller determines that a temperature of a coolant of the fuel cell stack is larger than a reference temperature.

* * * * *

UNITED STATES PATENT AND TRADEMARK OFFICE
CERTIFICATE OF CORRECTION

PATENT NO. : 10,892,500 B2
APPLICATION NO. : 15/936566
DATED : January 12, 2021
INVENTOR(S) : Chiaki Mizutani, Yuji Ishikawa and Shigeki Hasegawa Page 1 of 1

It is certified that error appears in the above-identified patent and that said Letters Patent is hereby corrected as shown below:

In the Specification

In Column 6, Line(s) 48, delete "hi" and insert --$\mathbf{f_H}$--, therefor.

In Column 9, Line(s) 46, delete "$W=10^8 R_{wet}^4 - 10^{-7} R_{wet}^3 - 10^{-5} R_{wet}^2 + 7 R_{wet}^{-4}$" and insert --$\mathbf{W = 10^{-8} R_{wet}^4 - 10^{-7} R_{wet}^3 - 10^{-5} R_{wet}^2 + 7 R_{wet}^{-4}}$--, therefor.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*